(12) United States Patent
Nanahara (10) Patent No.: US 10,247,270 B2
(45) Date of Patent: Apr. 2, 2019

(54) MOTION CONVERSION MECHANISM AND ELECTRIC BRAKE ACTUATOR USING THE SAME

(71) Applicant: TOYOTA JIDOSHA KABUSHIKI KAISHA, Toyota-shi, Aichi-ken (JP)

(72) Inventor: Masaki Nanahara, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/809,086

(22) Filed: Nov. 10, 2017

(65) Prior Publication Data

US 2018/0142747 A1    May 24, 2018

(30) Foreign Application Priority Data

Nov. 18, 2016    (JP) .................................. 2016-225278

(51) Int. Cl.
| | |
|---|---|
| *F16D 125/50* | (2012.01) |
| *F16D 65/18* | (2006.01) |
| *F16D 121/24* | (2012.01) |
| *F16D 125/40* | (2012.01) |

(52) U.S. Cl.
CPC .......... *F16D 65/18* (2013.01); *F16D 65/183* (2013.01); *F16D 2121/24* (2013.01); *F16D 2125/40* (2013.01); *F16D 2125/50* (2013.01)

(58) Field of Classification Search
CPC .... F16D 65/18; F16D 65/183; F16D 2121/24; F16D 2125/40; F16D 2125/50; F16H 55/06; F16H 1/30; F16H 3/68

USPC ................................ 475/226, 304, 333, 344
See application file for complete search history.

(56) References Cited

U.S. PATENT DOCUMENTS

| | | | | |
|---|---|---|---|---|
| 2,683,379 | A * | 7/1954 | Strandgren | ......... F16H 25/2252 74/424.92 |
| 3,173,304 | A * | 3/1965 | Strandgren | ......... F16H 25/2252 74/409 |
| 3,406,584 | A * | 10/1968 | Roantree | ............. F16H 25/2252 74/424.7 |
| 3,726,151 | A * | 4/1973 | Lemor | ................ F16H 25/2006 74/424.92 |

(Continued)

FOREIGN PATENT DOCUMENTS

| | | |
|---|---|---|
| EP | 1961995 A2 | 8/2008 |
| JP | 10504876 A | 5/1998 |

(Continued)

*Primary Examiner* — Thomas W Irvin
(74) *Attorney, Agent, or Firm* — Sughrue Mion, PLLC (57) ABSTRACT

A motion conversion mechanism includes: a cylindrical body having an internal screw and third gear teeth in an inner periphery thereof, the internal screw being provided in a screw region that is an intermediate region in an axial direction of the cylindrical body; a shaft body disposed coaxially with the cylindrical body inside the cylindrical body and having first gear teeth and a first external screw in an outer periphery thereof; and a plurality of planetary rollers. First planetary rollers among the planetary rollers mesh with the gear teeth formed in a first gear region and do not mesh with the gear teeth formed in a second gear region, and second planetary rollers among the planetary rollers mesh with the gear teeth formed in the second gear region and do not mesh with the gear teeth formed in the first gear region.

8 Claims, 5 Drawing Sheets

(56) References Cited

U.S. PATENT DOCUMENTS

| | | | |
|---|---|---|---|
| 5,829,557 A | | 11/1998 | Halasy-Wimmer et al. |
| 7,000,495 B2 * | | 2/2006 | Benoit ................ F16H 25/2252 |
| | | | 74/424.89 |
| 7,059,447 B1 * | | 6/2006 | Andonian ............ B62D 5/0451 |
| | | | 180/443 |
| 7,651,436 B2 * | | 1/2010 | Sugitani .................. F16C 19/50 |
| | | | 475/341 |
| 7,736,256 B2 * | | 6/2010 | Sugitani .................... B62D 3/02 |
| | | | 475/333 |
| 8,020,463 B2 * | | 9/2011 | Kinoshita ........... F16H 25/2252 |
| | | | 74/424.91 |
| 8,082,818 B2 * | | 12/2011 | Sugitani ............. F16H 25/2252 |
| | | | 74/424.91 |
| 8,220,132 B2 * | | 7/2012 | Kinoshita ........... F16H 25/2252 |
| | | | 29/466 |
| 8,579,090 B2 * | | 11/2013 | Yamasaki ............... F16D 65/18 |
| | | | 188/162 |
| 8,943,920 B2 * | | 2/2015 | Buvril ..................... F16H 25/12 |
| | | | 74/424.92 |
| 9,039,566 B2 * | | 5/2015 | Rudy ........................ F16H 1/28 |
| | | | 475/331 |
| 9,267,588 B2 * | | 2/2016 | Buvril ................. F16H 25/2252 |
| 10,018,257 B2 * | | 7/2018 | Abevi ................. F16H 25/2252 |
| 2005/0160856 A1 * | | 7/2005 | Sugitani ............. F16H 25/2252 |
| | | | 74/424.92 |
| 2008/0196529 A1 | | 8/2008 | Sugitani |
| 2013/0143711 A1 | | 6/2013 | Rudy |
| 2015/0377335 A1 * | | 12/2015 | Nolte ..................... F16H 48/11 |
| | | | 475/226 |

FOREIGN PATENT DOCUMENTS

| | | |
|---|---|---|
| JP | 2007-056952 A | 3/2007 |
| JP | 2010-060066 A | 3/2010 |

\* cited by examiner

MOTION CONVERSION MECHANISM AND ELECTRIC BRAKE ACTUATOR USING THE SAME

INCORPORATION BY REFERENCE

The disclosure of Japanese Patent Application No. 2016-225278 filed on Nov. 18, 2016 including the specification, drawings and abstract is incorporated herein by reference in its entirety.

BACKGROUND

1. Technical Field

The present disclosure relates to a mechanism for converting rotational motion into linear motion and to a vehicle brake actuator configured using the mechanism.

2. Description of Related Art

Japanese Unexamined Patent Application Publication No. 2010-60066 (JP 2010-60066 A) discloses a so-called planetary differential type motion conversion mechanism. The motion conversion mechanism is configured to include a cylindrical body, a shaft body, and a plurality of planetary rollers and converts the rotational motion of the cylindrical body into the linear motion of the shaft body. Gear teeth and an internal screw are formed in the inner periphery of the cylindrical body, gear teeth and an external screw are formed in the outer periphery of the shaft body, and gear teeth and an external screw are formed in the outer periphery of each of the planetary rollers, and the gear teeth mesh with each other and the screws are screwed to each other. More specifically, in the motion conversion mechanism, the internal screw is formed in a screw region that is an intermediate region in an axial direction in the inner periphery of the cylindrical body, the gear teeth are formed in each of a first gear region and a second gear region that are two regions sandwiching the screw region therebetween in the axial direction, and the gear teeth of each of the planetary rollers mesh with both the gear teeth of the first gear region and the gear teeth of the second gear region.

SUMMARY

In a case where the gear teeth are formed in each of the two regions spaced apart from each other in the axial direction in the inner periphery of the cylindrical body, it is difficult to form the gear teeth of the two regions such that phases precisely match each other, in other words, to form the gear teeth of the two regions without misalignment in a circumferential direction. In JP 2010-60066 A, a ring is inserted into each of the ends of the cylindrical body, and gear teeth are formed in each of the rings. Therefore, it is difficult to fix the rings in the cylindrical body such that the gear teeth formed in the rings are in phase. Further, in a case where the phases of the two groups of gear teeth are not in a precisely matched state, a force tilting the planetary rollers in the circumferential direction acts on the planetary rollers. In other words, a torsion occurs in the planetary roller. In that case, the operation resistance of the motion conversion mechanism becomes relatively large, and thus the smooth operation of the motion conversion mechanism is hindered. That is, the torsion of the planetary roller causes a torque loss in the motion conversion mechanism, which leads to deterioration of the conversion efficiency of the motion conversion mechanism. The disclosure provides a motion conversion mechanism that can operate smoothly, and provides an electric brake actuator that can operate smoothly by using the motion conversion mechanism.

A motion conversion mechanism according to an aspect is made such that some of a plurality of planetary rollers mesh with gear teeth formed in one of a first gear region and a second gear region that are two regions of a cylindrical body and do not mesh with gear teeth formed in the other of the first gear region and the second gear region. The motion conversion mechanism is made such that the rest of the planetary rollers mesh with the gear teeth formed in the other of the first gear region and the second gear region and do not mesh with the gear teeth formed in one of the first gear region and the second gear region.

Further, an electric brake actuator according to the aspect uses the motion conversion mechanism according to the aspect and is configured so as to linearly move a piston for pressing a friction member against a rotating body rotating together with a wheel, by rotating one of the cylindrical body and the shaft body by an electric motor and linearly moving the other of the cylindrical body and the shaft body.

With the motion conversion mechanism according to the aspect, the gear teeth of each of the planetary rollers do not mesh with the gear teeth formed in both of the two regions on the inner periphery of the cylindrical body, and therefore, even though a certain degree of misalignment occurs in the phases of the gear teeth formed in each of the two regions, the motion conversion mechanism operates smoothly. Further, with the electric brake actuator according to the aspect using the motion conversion mechanism, due to the smooth operation of the motion conversion mechanism, an electric brake actuator that operates smoothly is realized.

Hereinafter, some aspects in this application will be exemplified and described. The following aspects are merely for facilitating understanding of the aspects, and do not intend to limit combinations of constituent elements in the following aspects to those described below. That is, the aspects should be interpreted taking into consideration the description that will be described later, the description of an example, and the like, and an aspect in which other constituent elements are further added to each of the aspects and an aspect in which some constituent elements are removed from each of the aspects can also be aspects as long as they conform to the interpretation. Incidentally, at least a part of the aspect is the claimed invention.

A first aspect relates to a motion conversion mechanism including: a cylindrical body, a shaft body disposed coaxially with the cylindrical body, and the shaft body which is inside the cylindrical body, and a plurality of planetary rollers, each of the planetary rollers being disposed between the shaft body and the cylindrical body, being configured to revolve around the shaft body, and being configured to rotate on a planetary roller's own axis. The plurality of planetary rollers includes a plurality of first planetary rollers and a plurality of second planetary rollers. The shaft body has a shaft body external screw and shaft body gear teeth in an outer periphery of the shaft body. The plurality of the first planetary rollers has a first planetary roller external screw which meshes with the shaft body external screw of the shaft body, and a first planetary roller gear teeth which meshes with the shaft body gear teeth of the shaft body, in an outer periphery of the plurality of the first planetary rollers. The plurality of the second planetary rollers has a second planetary roller external screw which meshes with the shaft body external screw of the shaft body, and a second planetary roller gear teeth which meshes with the shaft body gear teeth of the shaft body, in an outer periphery of the plurality of the second planetary rollers. The cylindrical body has an internal screw provided in a screw region that is an intermediate region in an axial direction of the cylindrical body, and meshes with the first planetary roller external screw and the second planetary roller external screw, and a first cylindrical body gear teeth and a second cylindrical body gear teeth, each of which is provided in each of a first gear region and a second gear region, which are two regions sandwiching the screw region between the two regions in the axial direction. The first planetary roller external screw provided in each of the first planetary rollers meshes with the internal screw provided in the screw region of the cylindrical body, and the first planetary roller gear teeth provided in each of the first planetary rollers mesh with the first cylindrical body gear teeth provided in the first gear region of the cylindrical body without meshing with the second cylindrical body gear teeth provided in the second gear region of the cylindrical body. The second planetary roller external screw provided in each of the second planetary rollers meshes with the internal screw provided in the screw region of the cylindrical body, and the second planetary roller gear teeth provided in each of the second planetary rollers mesh with the second cylindrical body gear teeth provided in the second gear region of the cylindrical body without meshing with the first cylindrical body gear teeth provided in the first gear region of the cylindrical body.

It is desirable that the so-called planetary differential type motion conversion mechanism has a structure in which the axis of the cylindrical body and the axis of the shaft body do not tilt relative to each other, that is, a structure having stable coaxiality, because the cylindrical body and the shaft body move relative to each other, and in that sense, it is desirable that the cylindrical body, the planetary rollers, and the shaft body mesh with and are screwed to each other with a certain degree of length in the axial direction. In a motion conversion mechanism having such a structure, in a case where screws (mean threads or screw grooves) and gear teeth are provided in the inner peripheries or the outer peripheries of the cylindrical body, the planetary rollers, and the shaft body, it is also conceivable to provide both the screw and the gear teeth in one region having a certain degree of length in the axial direction. In short, it is also conceivable to form the screw and the gear teeth as if the screw and the gear teeth form a texture. However, in a case where both the screw and the gear teeth are provided in one region on the inner periphery of the cylindrical body, there is difficulty in machining, and when the inner diameter of the cylindrical body is relatively small, the difficulty in machining becomes relatively high. Therefore, in a case where the screw and the gear teeth are provided in the inner periphery of the cylindrical body, due to the coaxial stability of the shaft body and the cylindrical body, the region of an intermediate portion in the axial direction is set as a screw region and an internal screw is provided in the region, and two regions sandwiching the region therebetween in the axial direction are set as first and second gear regions, the first cylindrical body gear teeth is provided in the first gear region, and the second cylindrical body gear teeth is provided in the second gear region.

In a case where the first and second cylindrical body gear teeth are provided in each of the first and second gear regions, it is needed that the positions, that is, the phases, precisely match each other in the circumferential direction of the gear teeth of the regions. Due to ease of machining for forming the screw and the gear teeth, it is also conceivable to manufacture the cylindrical body by configuring the cylindrical body so as to include a main body and two rings fixed to both ends in the axial direction of the main body, forming an internal screw in the main body, and fixing two rings; i.e., the first ring and the second ring, each having gear teeth formed therein to the main body. In that case, it is particularly difficult to perform the fixing of the two rings in a state where the phases of the gear teeth formed in each of the rings are precisely matched.

In a case where the mutual phases of the first cylindrical body gear teeth of the first gear region and the second cylindrical body gear teeth of the second gear region are not precisely matched, in other words, in a case where the phase of the first cylindrical body gear teeth and the phase of the second cylindrical body gear teeth are misaligned to some extent, when a planetary roller that meshes with both of these gear teeth is disposed, a force tilting the planetary roller in the circumferential direction acts on the planetary roller. In other words, a torsion is generated in the planetary roller. In such a state, the operation resistance of the motion conversion mechanism becomes relatively large, and thus the smooth operation of the motion conversion mechanism is hindered. That is, the torsion of the planetary roller causes a torque loss in the motion conversion mechanism, which leads to deterioration of the conversion efficiency of the motion conversion mechanism.

In view of the above, in the motion conversion mechanism according to the first aspect, the planetary rollers have two groups and made such that although the external screws of the planetary rollers of either group mesh with the internal screw of the screw region of the cylindrical body, the gear teeth of the planetary rollers in each of groups mesh with merely one of the first gear teeth of the first gear region and the second gear teeth of the second gear region of the cylindrical body. For this reason, a force tilting each planetary roller in the circumferential direction or a force causing a torsion in each planetary roller does not act on each planetary roller, and thus the smooth operation of the motion conversion mechanism is not hindered, so that the conversion efficiency of the motion conversion mechanism is good. Further, in the motion conversion mechanism according to the first aspect, both the first cylindrical body gear teeth of the first gear region and the second cylindrical body gear teeth of the second gear region mesh with the gear teeth of any of the planetary rollers. For this reason, the cylindrical body and the shaft body support each other through the planetary rollers at locations spaced apart from each other in the axial direction, and thus the motion conversion mechanism according to the first aspect has a structure in which the coaxiality between the cylindrical body and the shaft body during operation is stable.

With the motion conversion mechanism according to the first aspect, the shaft body external screw and the shaft body gear teeth of the shaft body may be provided in the same region or may be provided in regions different from each other in the axial direction. Similarly, the first planetary roller external screw and the first planetary roller gear teeth of the first planetary roller may be provided in the same region or may be provided in regions different from each other in the axial direction. In addition, the second planetary roller external screw and the second planetary roller gear teethe of the second planetary roller may be provided in the same region or may be provided in regions different from each other in the axial direction.

Further, with the motion conversion mechanism according to the first aspect, the motion conversion mechanism may be configured so as to linearly move the cylindrical body by rotating the shaft body or may be configured so as to linearly move the shaft body by rotating the cylindrical body. In view of inertia against the rotation of the object that is rotated, the former, that is, a configuration to linearly move the cylindrical body having a relatively large diameter by rotating the shaft body having a relatively small diameter, is advantageous in that a force for the rotation can become relatively small.

In the motion conversion mechanism according to the first aspect, the shaft body external screw and the shaft body gear teeth of the shaft body may be provided in the same region in the axial direction, and the external screw and the gear teeth of each of the planetary rollers may be provided in the same region in the axial direction.

With the motion conversion mechanism according to the first aspect, in both the shaft body and each of the planetary rollers, the external screws and the gear teeth are provided in the same region. In other words, the region where the external screw is formed and the region where the gear teeth are formed are the same region. The shaft body and the planetary rollers are formed as if the external screw and the gear teeth form a texture on the outer periphery. The formation of such external screw and gear teeth can be performed relatively easily as compared with the formation of an internal screw and gear teeth in the same region on the inner periphery of the cylindrical body.

In a case where the external screw and the gear teeth are formed in different regions in the axial direction in each of the shaft body and the planetary rollers, when the external screw and the gear teeth are configured to move relative to each other, either the shaft body gear teeth of the shaft body or the planetary roller gear teeth of each of the planetary rollers have to be provided over a relatively long region in the axial direction. In contrast, with the motion conversion mechanism according to the first aspect, even though the motion conversion mechanism has such a structure that the shaft body and the planetary rollers move relative to each other, because the gear teeth are also provided in the region where the external screw is provided, there is an advantage that the length in the axial direction of at least one of the shaft body and the planetary rollers can be relatively shortened. That is, with the motion conversion mechanism according to the first aspect, a relatively compact motion conversion mechanism is realized.

In the motion conversion mechanism according to the first aspect, the number of the first planetary rollers may be equal to the number of the second planetary rollers, and each of the first planetary rollers may be disposed coaxially with any one of the second planetary rollers.

In short, with the motion conversion mechanism according to the first aspect, a plurality of planetary roller pairs each composed of two planetary rollers arranged coaxially in the axial direction are disposed. In other words, the planetary roller pair is formed by dividing a planetary roller having planetary roller gear teeth that mesh with both the first gear teeth of the first gear region and the second gear teeth of the second gear region of the cylindrical body, in the axial direction. With the motion conversion mechanism according to the first aspect, the shaft body and the cylindrical body are mutually supported through the planetary rollers at the same location in the circumferential direction at both the position where the first gear region is present and the position where the second gear region is present, in the axial direction, and therefore, a motion conversion mechanism that is stable in operation is realized.

The planetary rollers may have the same length or may have lengths different from each other. For example, in a case where some of either the first planetary rollers or the second planetary rollers are relatively long and the rest is relatively short, when the relatively long first planetary rollers and the relatively short second planetary rollers are disposed coaxially with each other, and the relatively short first planetary rollers and the relatively long second planetary rollers are disposed coaxially with each other, it is possible to make the relatively long first planetary roller and the relatively long second planetary roller overlap in the axial direction. When the planetary rollers are configured in this way, the cylindrical body and the shaft body are firmly supported mutually through a larger number of planetary rollers in the overlapping portion as described above, and therefore, it is possible to improve the strength of the motion conversion mechanism.

In the motion conversion mechanism according to the first aspect, the first planetary rollers and the second planetary rollers may be disposed such that all the first planetary rollers are located at positions different in a circumferential direction from any of the second planetary rollers.

With the motion conversion mechanism according to the first aspect, in short, each of the planetary rollers can be considered to partially support the cylindrical body and the shaft body at the location where the external screw of each of the planetary rollers is provided. The first planetary rollers and the second planetary rollers respectively support a first end side and a second end side in the axial direction of the cylindrical body, whereby the rotational phase of the shaft body is determined. For this reason, each of the planetary rollers is disposed according to the phase, and therefore, tilt of each of the planetary rollers is suppressed. The length of the planetary roller itself can be relatively shortened as compared with a motion conversion mechanism in which planetary rollers having planetary roller gear teeth that mesh with both the first gear teeth of the first gear region and the second gear teeth of the second gear region are disposed, and therefore, the motion conversion mechanism according to the first aspect becomes a lightweight mechanism.

In the motion conversion mechanism according to the first aspect, the first planetary rollers and the second planetary rollers may be disposed such that each of the first planetary rollers overlaps with any of the second planetary rollers in the axial direction.

With the motion conversion mechanism according to the first aspect, similar to the motion conversion mechanism according to the first aspect described above, the cylindrical body and the shaft body are firmly supported mutually through a larger number of planetary rollers in the overlapping portion, and therefore, it is possible to improve the strength of the motion conversion mechanism.

In the motion conversion mechanism according to the first aspect, the cylindrical body may be configured to include a main body, a first ring and a second ring respectively fixed to both ends in the axial direction of the main body, the main body may have the internal screw, the first ring may have the first gear teeth, and the second ring may have the second gear teeth.

As described above, forming the gear teeth and the internal screw in the inner periphery of the cylindrical body involves considerable difficulty in terms of the machining of forming the gear teeth and the internal screw. According to the first aspect, it is possible to easily manufacture the cylindrical body in which the internal screw is formed in a screw region and the gear teeth are provided in each of the first gear region and the second gear region sandwiching the screw region therebetween in the axial direction, by forming merely an internal screw in the inner periphery of the main body of the cylindrical body and merely fixing two rings, i.e., the first and second rings, each having merely gear teeth, i.e., the first gear teeth and the second gear teeth, formed therein to both ends of the main body, respectively. Even though the cylindrical body is made in this manner, in the motion conversion mechanism according to the first aspect, the tilt of the planetary rollers in the circumferential direction is suppressed as described above, and therefore, when fixing the first and second rings, the positions in the circumferential direction, that is, the phase of the first gear teeth formed in the first ring and the phase of the second gear teeth formed in the second ring are not needed to be strictly precise. Also in this regard, it becomes possible to simply and easily perform the manufacturing of the cylindrical body.

In the motion conversion mechanism according to the first aspect, each of a first ratio between the number of threads of the shaft body external screw provided in the shaft body, the number of threads of the first planetary roller external screw provided in the first planetary rollers, the number of threads of the second planetary roller external screw provided in the second planetary rollers, and the number of threads of the internal screw provided in the cylindrical body, and a second ratio between the number of teeth of the shaft body gear teeth provided in the shaft body, the number of teeth of the first planetary rollers gear teeth provided in the first planetary rollers, the number of teeth of the second planetary rollers gear teeth provided in the second planetary rollers, and the number of teeth of the first cylindrical body gear teeth and the second cylindrical body gear teeth provided in the cylindrical body is set to a ratio that in a case where one of the cylindrical body and the shaft body is rotated, the cylindrical body and each of the first and second planetary rollers do not move relative to each other in the axial direction and the shaft body and each of the first and second planetary rollers move relative to each other in the axial direction.

With the motion conversion mechanism according to the first aspect, the cylindrical body and each of the planetary rollers do not move relative to each other, and therefore, the dimension in the axial direction of the cylindrical body or the length in the axial direction of each of the planetary rollers can be made to be relatively small, so that a compact motion conversion mechanism is realized.

A second aspect relates to an electric brake actuator including: an electric motor; a piston configured to press a friction member against a rotating body that rotates together with a wheel; and the motion conversion mechanism according to the first aspect described above, in which the motion conversion mechanism is configured such that one of the cylindrical body and the shaft body is rotated by the electric motor and the other of the cylindrical body and the shaft body linearly moves the piston in the axial direction.

With the electric brake actuator according to the second aspect, the motion conversion mechanism according to the first aspect having the advantage as described above, for example, the advantage that an operation is smooth, is adopted, and therefore, an electric brake actuator having the advantage is obtained. Further, when the shaft body is rotated by the electric motor and the piston is linearly moved by the linear motion of the cylindrical body having a larger diameter than the shaft body, more stable pressing of a friction member against the rotating body becomes possible.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Hereinafter, as forms for implementing the aspect, an electric brake actuator that is an example of the aspect, and a motion conversion mechanism of an example that is used in the electric brake actuator, and a motion conversion mechanism as a modification example will be described in detail with reference to the drawings. The aspect can be implemented in various forms with various changes and improvements applied thereto based on the knowledge of those skilled in the art, including the forms described in the "SUMMARY" described above, in addition to the forms of the example and the modification example described below.

[A] Brake Caliper

Figure 1:
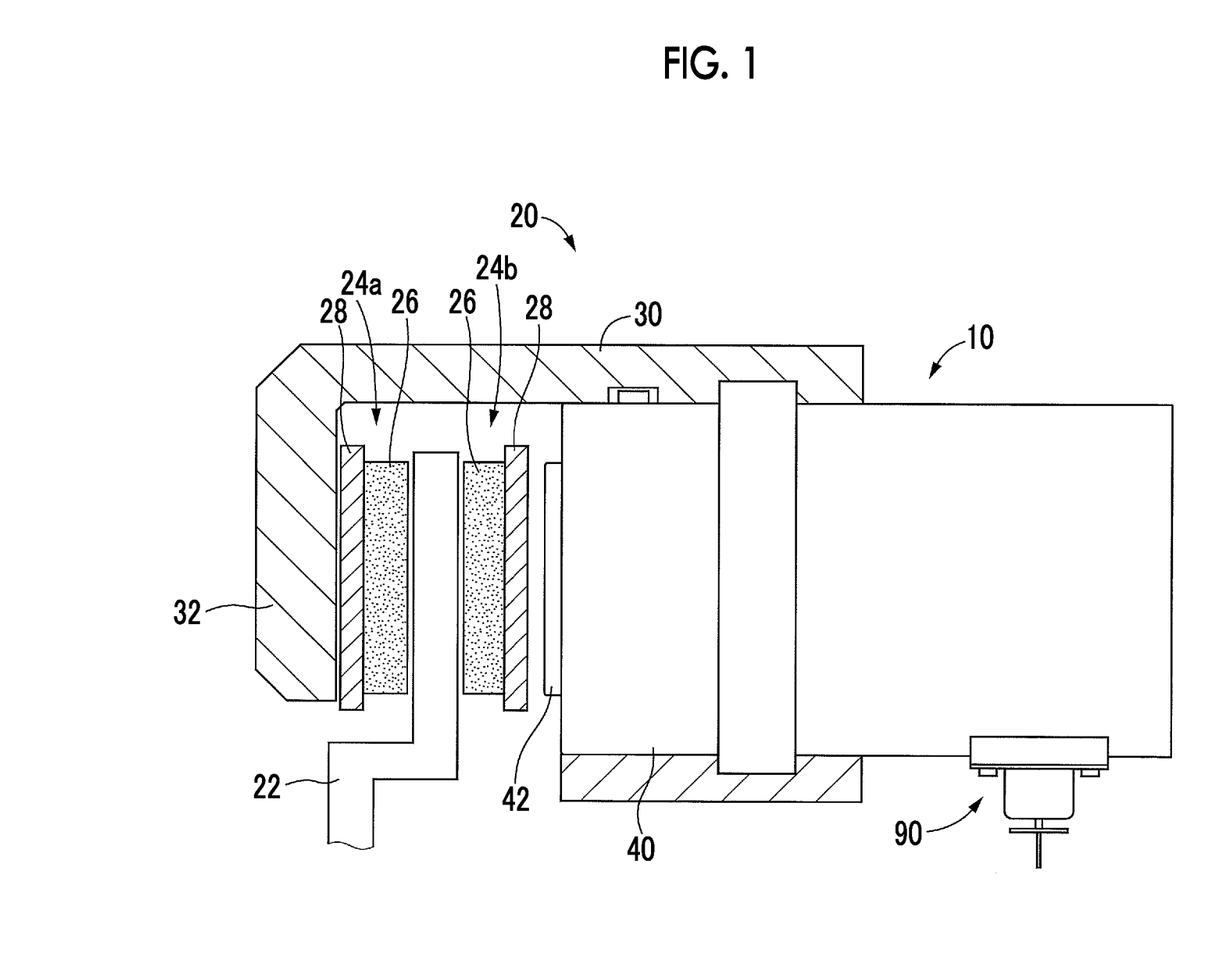
FIG. 1 is a sectional view showing a brake caliper in which an electric brake actuator of an example adopting a motion conversion mechanism of an example is disposed.

As shown in FIG. 1, an electric brake actuator 10 (hereinafter, there is a case where it is abbreviated simply as an "actuator 10") of an example is disposed as a constituent element of a brake caliper 20 (hereinafter, there is a case where it is abbreviated simply as a "caliper 20"). The caliper 20 is held movably in an axial direction (a right-and-left direction in the drawing) on a mount (not shown) provided at a carrier (not shown) rotatably holding a wheel, so as to straddle a disc rotor 22 as a rotating body that rotates together with the wheel. A pair of brake pads (hereinafter, there is a case where it is abbreviated simply as "pads") 24a, 24b is held on the mount so as to sandwich the disc rotor 22 therebetween in a state where a movement in the axial direction is permitted. Each of the pads 24a, 24b is configured to include a friction member 26 that is located on the side coming into contact with the disc rotor 22, and a backup plate 28 supporting the friction member 26, and is made such that the friction member 26 is pressed against the disc rotor 22.

For convenience, description will be made with the left side in the drawing referred to as the front side and the right side in the drawing referred to as the rear side. The pad 24a on the front side is made so as to be supported on a lug portion 32 that is a front end portion of a caliper main body 30. The actuator 10 is held such that a housing 40 of the actuator 10 is fixed to a portion on the rear side of the caliper main body 30. The actuator 10 has a piston 42 that advances and retreats with respect to the housing 40, and the piston 42 advances, whereby a front end portion, specifically, a front end thereof engages with the pad 24b on the rear side, specifically, the backup plate 28 of the pad 24b. Then, the piston 42 further advances in the engaged state, whereby the pair of pads 24*a*, 24*b* clamps the disc rotor 22. In other words, the respective pads 24*a*, 24*b* are pressed against the disc rotor 22. Due to the pressing against the disc rotor 22, a braking force against the rotation of the wheel, which is dependent on the frictional force between the disc rotor 22 and the friction member 26, that is, a braking force for decelerating and stopping a vehicle is generated.

[B] Electric Brake Actuator

Figure 2:
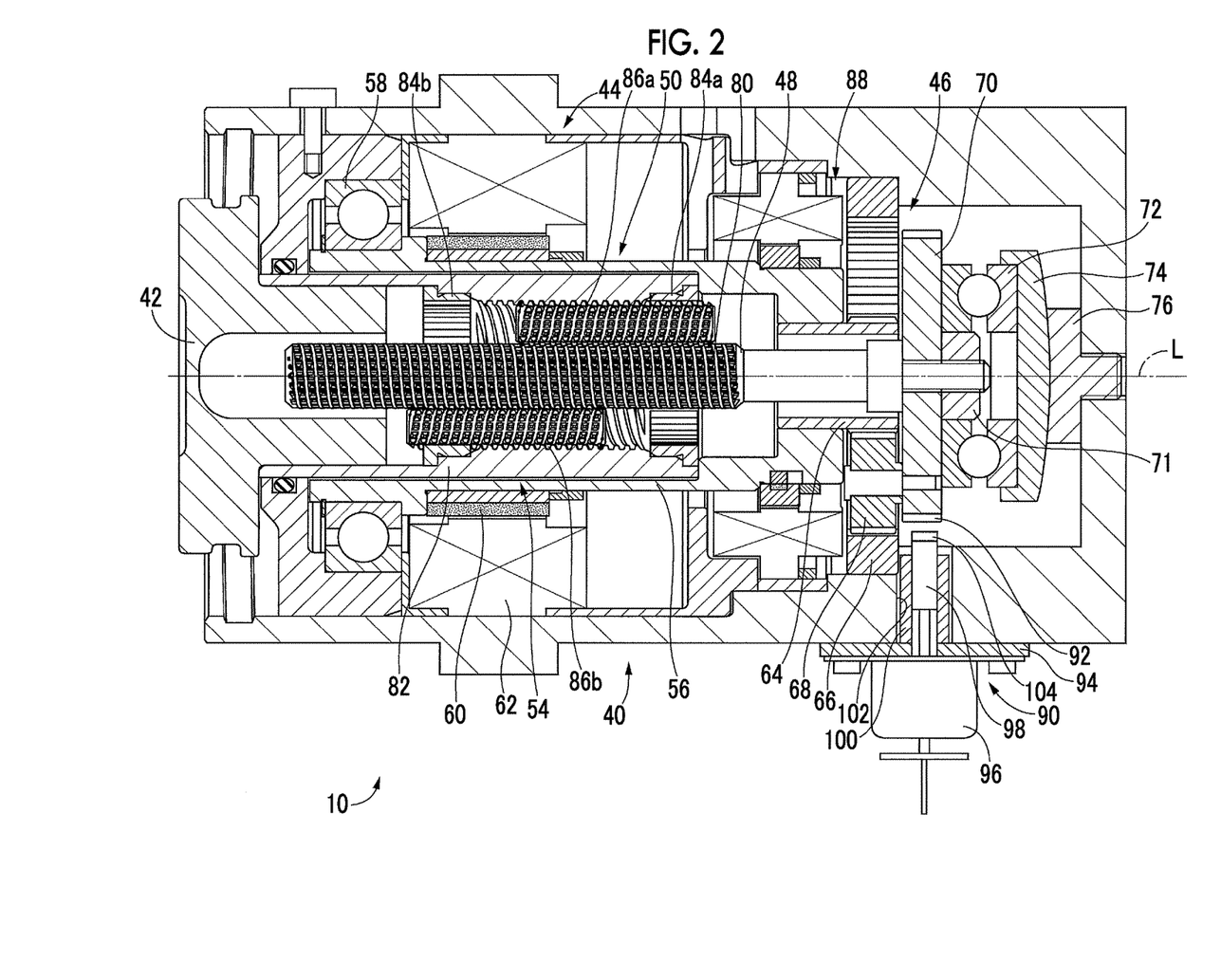
FIG. 2 is a sectional view showing the electric brake actuator of the example.

The electric brake actuator 10 of the example is configured to include, in addition to the housing 40 and the piston 42, a motion conversion mechanism 50 that is configured to include an electric motor 44 as a drive source, a speed reduction mechanism 46 for decelerating the rotation of the electric motor 44, and an input shaft 48 that is rotated by the rotation of the electric motor 44 decelerated through the speed reduction mechanism 46, and converts the rotational motion of the input shaft 48 into linear motion (advance and retreat motion) of the piston 42, and the like, as shown in FIG. 2. In the following description, for convenience, the left side in the drawing will be referred to as the front side and the right side in the drawing will be referred to as the rear side.

The piston 42 is fixed and supported by being inserted into an output cylinder 54 that is a constituent element of the motion conversion mechanism 50, and the piston 42 and the output cylinder 54 are made to be non-rotatable with respect to the housing 40. On the other hand, the electric motor 44 has a rotary drive shaft 56 having a cylindrical shape, and the output cylinder 54 is disposed inside the rotary drive shaft 56 such that the input shaft 48 that is a constituent element of the motion conversion mechanism 50 is coaxial with the output cylinder 54 inside the output cylinder 54, specifically, the axes of the rotary drive shaft 56, the output cylinder 54, and the input shaft 48 are on an axis L, which is an axis common to each other. As a result, the actuator 10 is made to be compact.

The rotary drive shaft 56 is held in the housing 40 so as to be rotatable through a radial bearing 58 and be immovable in the axial direction (a direction in which the axis L extends, and the right-and-left direction in the drawing). The electric motor 44 is configured to include a magnet 60 disposed on one circumference in the outer periphery of the rotary drive shaft 56, and a coil 62 fixed to the inner periphery of the housing 40 so as to surround the magnet 60.

The speed reduction mechanism 46 is a planetary gear type speed reduction mechanism that is configured to include a hollow sun gear 64 fixedly attached to a rear end of the rotary drive shaft 56, a ring gear 66 fixed to the housing 40, and a plurality of planetary gears 68 (in the drawing, merely one is shown) that meshes with both the sun gear 64 and the ring gear 66 and revolves around the sun gear 64. Each of the planetary gears 68 is rotatably held by a flange 70 as a carrier. The flange 70 is clamped by the input shaft 48 and a nut 71 that is screwed to a male screw portion formed at a rear end portion of the input shaft 48, thereby being fixed to the input shaft 48, and rotates integrally with the input shaft 48. The rotation of the rotary drive shaft 56, that is, the rotation of the electric motor 44 is decelerated and transmitted as the rotation of the input shaft 48 through the speed reduction mechanism 46 configured as described above.

Incidentally, the input shaft 48 is rotatably and axially immovably supported on the housing 40, specifically, a seat 76 screwed and fixed to the housing 40, through the flange 70, a thrust bearing 72, and a support plate 74. The surface on the rear side of the support plate 74 is made to be a part of a convex spherical surface having a relatively large diameter, and the surface on the front side of the seat 76 is made to be a part of a concave spherical surface that is fitted to the surface on the rear side of the support plate 74. These surfaces come into sliding contact with each other and allow slight displacement in the radial direction of the support plate 74. Accordingly, tilting of the input shaft 48 with respect to the axis L, that is, tilting of the piston 42 with respect to the axis L is permitted. Due to the tilting, for example, even in a state where the brake pads 24*a*, 24*b* are subjected to partial wear (it means a phenomenon in which a portion on one side is worn greatly than a portion on the opposite side), it is possible to generate an appropriate braking force.

The motion conversion mechanism 50 of the example is a so-called planetary differential type motion conversion mechanism configured to include the input shaft 48, the output cylinder 54, and a plurality of planetary rollers 86 disposed between the outer periphery of the input shaft 48 and the inner periphery of the output cylinder 54, and converts the rotational motion of the input shaft 48 into the linear motion of the output cylinder 54. The output cylinder 54 is composed of a cylinder main body 82 and two ring gears 84 that are respectively inserted into and fixed to both ends in the axial direction of the cylinder main body 82, specifically, a rear end portion and a portion close to a front end portion of the cylinder main body 82. Incidentally, as the planetary rollers 86, four planetary rollers 86 are disposed in the motion conversion mechanism 50 (in the drawing, merely two planetary rollers are shown). Further, the four planetary rollers 86 can be grouped into two groups each composed of two planetary rollers 86, according to a disposition position, and in the drawing, the planetary rollers are shown with the planetary rollers 86 belonging to one group of the two groups as first planetary rollers 86*a* and the planetary rollers 86 belonging to the other group as second planetary rollers 86*b*. That is, the planetary rollers 86 are generic names of the first planetary rollers 86*a* and the second planetary rollers 86*b*, and in the following description, there is a case where the generic name is used. Similarly, the two ring gears 84 are generic names, and in the drawing, the ring gears are shown with the ring gear 84 that is located on the rear side as a first ring gear 84*a* and the ring gear 84 that is located on the front side as a second ring gear 84*b*. Similarly, in the following description, there is a case where the generic name, such as the ring gear 84, is used.

The motion conversion mechanism 50 has a function of converting the rotational motion of the input shaft 48 by the rotation of the electric motor 44 into the linear motion of the output cylinder 54 and linearly moving the piston 42. However, the configuration and operation of the motion conversion mechanism 50 will be described in detail later.

As can be seen from the above description, in the actuator 10, the electric motor 44 rotates, whereby the piston 42 is linearly moved, that is, moved forward and backward. The state shown in the drawing is a position where the piston 42 is located on the rearmost end side in a movable range, and specifically, when the electric motor 44 is rotated positively from this state, the piston 42 advances, and as can be seen from FIG. 1, in a state where the front end of the piston 42 has engaged with the pad 24*b*, the pads 24*a*, 24*b* are pressed against the disc rotor 22, so that a braking force is generated. Incidentally, the magnitude of the braking force is a magnitude corresponding to a current that is supplied to the electric motor 44. Thereafter, when the electric motor 44 is rotated reversely, the piston 42 retreats, and thus the engagement between the piston 42 and the pad 24*b* is released, so that a state where the braking force is not generated is created, and finally, the piston 42 returns to the position shown in FIG. 1.

In addition to the constituent elements described above, in the actuator 10, a resolver 88 is provided as a motor rotation angle sensor that detects the rotation angle of the electric motor 44. It is possible to detect the position and the movement amount in the axial direction of the piston 42, based on the detection signal of the resolver 88.

Further, in the actuator 10, in order to exert a function as an electric parking brake, a piston retreat prohibiting mechanism 90 that prohibits a retreat of the piston 42 in a state where the piston 42 has advanced is provided.

The piston retreat prohibiting mechanism 90 will be described. The flange 70 rotates with the rotation of the input shaft 48, and therefore, the flange 70 functions as an interlocking rotating body that rotates in conjunction with the advancing and retreating motion of the piston 42. A ratchet tooth 92 is formed on the outer periphery of the flange 70. On the other hand, a solenoid 96 that is an electromagnetic actuator is fixed to the housing 40 of the actuator 10 through a seat plate 94, and a locking rod 98 can be moved in the axial direction thereof by the solenoid 96. A guide sleeve 100 is attached to the seat plate 94, and the locking rod 98 is advanced and retreated in a state of being guided by the guide sleeve 100. Incidentally, a cutout 102 is formed in the housing 40 of the actuator 10, the guide sleeve 100 is present in the cutout 102, and the tip of the locking rod 98 fits into the interior of the housing 40.

A holder 104 is formed at the tip of the locking rod 98, and the holder 104 can engage with the ratchet tooth 92 of the flange 70. FIG. 2 shows a state where the locking rod 98 is located at a position where the holder 104 cannot engage with the ratchet tooth 92. When the solenoid 96 is excited by energization, the locking rod 98 moves forward and the holder 104 engages with the ratchet tooth 92. The directions of the ratchet tooth 92 and the holder 104 are set such that in a state where the holder 104 engages with the ratchet tooth 92, the rotation of the flange 70 in a direction in which the piston 42 retreats is prohibited and the rotation of the flange 70 in a direction in which the piston 42 advances is permitted.

In a case where parking brake is applied, the solenoid 96 is energized to advance the locking rod 98, and in a state where the piston 42 is advanced by the electric motor 44 until a needed braking force is obtained, the energization to the solenoid 96 is released. Even though the energization to the solenoid 96 is released, the locking rod 98 is maintained in an advanced state with the action by the shapes of the ratchet tooth 92 and the holder 104. On the other hand, in a case of releasing the parking brake, the piston 42 is further advanced by the electric motor 44. In this way, the engagement between the holder 104 and the ratchet tooth 92 is released, and the locking rod 98 is retreated by the restoring force of the solenoid 96. In this state, the piston 42 is retreated by the electric motor 44, and thus the parking brake is released.

[C] Motion Conversion Mechanism

The basic configuration of the motion conversion mechanism 50 will be described. The motion conversion mechanism 50 is a planetary differential type motion conversion mechanism that is configured to include a cylindrical body, a shaft body disposed coaxially with the cylindrical body inside the cylindrical body; and a plurality of planetary rollers, each of the planetary rollers being disposed between the shaft body and the cylindrical body, being configured to revolve around the shaft body, and being configured to rotate on its own axis, and that converts the rotational motion of one of the cylindrical body and the shaft body into the linear motion in the axial direction of the other of the cylindrical body and the shaft body. Specifically, the output cylinder 54 functions as the cylindrical body, the input shaft 48 functions as the shaft body, and the planetary rollers 86 function as the planetary rollers. The cylinder main body 82 configuring the output cylinder 54 functions as a main body of the cylindrical body, and the two ring gears 84a, 84b function as rings respectively fixed to both ends in the axial direction of the main body. The motion conversion mechanism 50 is made so as to convert the rotational motion of the input shaft 48 that is one of the cylindrical body and the shaft body into the linear motion in the axial direction of the output cylinder 54 that is the other of the cylindrical body and the shaft body.

Figure 3A:
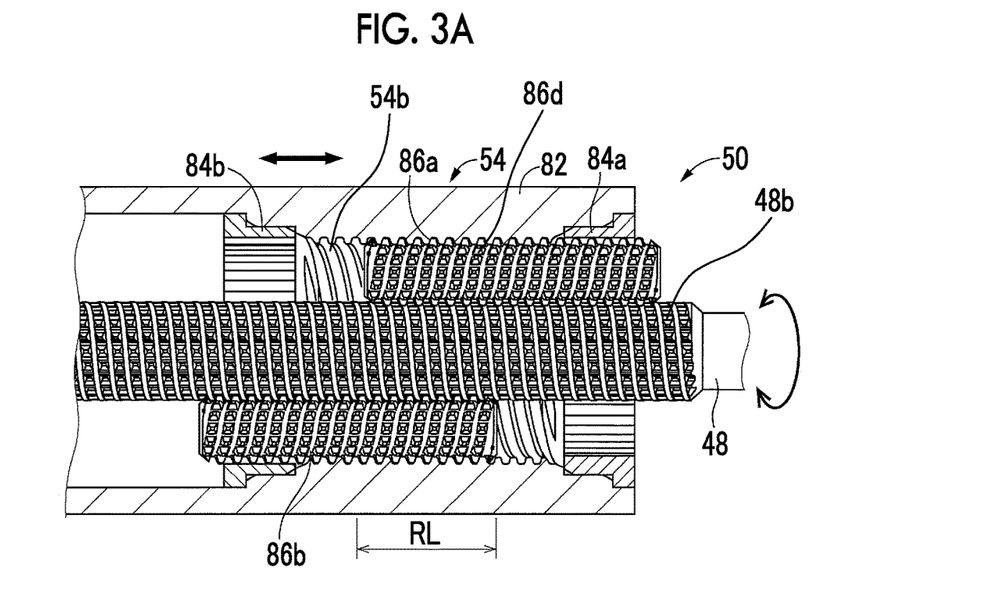
FIG. 3A is a sectional view showing the motion conversion mechanism of the example.

Description will be further made with reference to FIG. 3A as well. In the input shaft 48, an external screw 48b and gear teeth 48a are provided in the same region in the axial direction in the outer periphery of the input shaft 48. Also in each of the four planetary rollers 86, an external screw 86d and gear teeth 86c are provided in the same region in the axial direction in the outer periphery of each of the four planetary rollers 86. In other words, the region where the external screw is formed and the region where the gear teeth are formed overlap so as to match with each other. Therefore, in FIGS. 2, and 3A to 3C, each of the outer peripheral surface of the input shaft 48 and the outer peripheral surface of the planetary roller 86 appears as if a texture is formed by the external screw and the gear teeth.

Figure 3B:
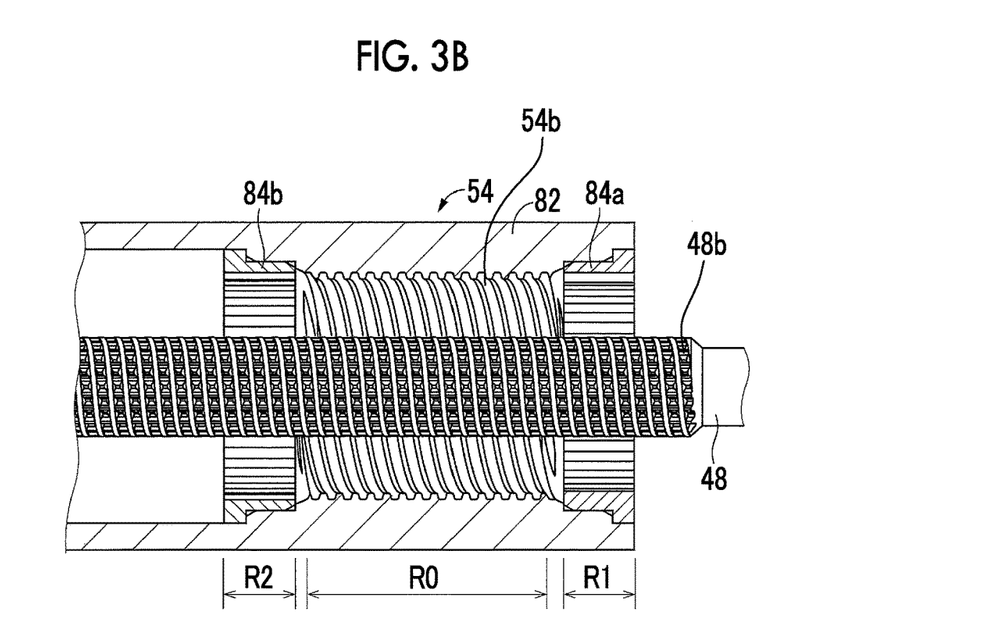
FIG. 3B is a sectional view showing the motion conversion mechanism of the example in a state where planetary rollers are removed.

FIG. 3B shows a state where the planetary rollers 86 are removed, and referring also to this drawing, in the output cylinder 54, in consideration of the ease of machining for forming an internal screw 54b and gear teeth 54a, the internal screw 54b is provided in the cylinder main body 82 and the gear teeth 54a are provided in each of the two ring gears 84 that are fixed to the cylinder main body 82. Therefore, as can also be seen from the drawing, in the output cylinder 54, the internal screw 54b is provided in a screw region R0 that is an intermediate region in the axial direction in the inner periphery of the output cylinder 54, and the gear teeth 54a are provided in each of a first gear region R1 and a second gear region R2 that are two regions adjacent to the screw region R0 with the screw region R0 interposed therebetween in the axial direction. Incidentally, the region where the gear teeth of the first ring gear 84a are present is the first gear region R1, and the region where the gear teeth of the second ring gear 84b are present is the second gear region R2.

The gear teeth 48a provided in the input shaft 48 and the gear teeth 86c provided in the planetary rollers 86 mesh with each other, and the external screw 48b provided in the input shaft 48 and the external screws 86d provided in the planetary rollers 86 are screwed to each other. On the other hand, the gear teeth 86c provided in the planetary rollers 86 and the gear teeth 54a provided in the output cylinder 54 mesh with each other, and the external screws 86d provided in the planetary rollers 86 and the internal screw 54b provided in the output cylinder 54 are screwed to each other. The external screw 48b of the input shaft 48, the external screws 86d of the planetary rollers 86, and the internal screw 54b of the output cylinder 54 are made to have the same pitch as each other.

In the motion conversion mechanism 50, each of the ratio between the number of threads of the external screw 48b of the input shaft 48, the number of threads of the external screw 86d of each of the four planetary rollers 86, and the number of threads of the internal screw 54b of the output cylinder 54, and the ratio between the number of teeth of the gear teeth 48a of the input shaft 48, the number of teeth of the gear teeth 86c of each of the four planetary rollers 86, and the number of teeth of the gear teeth 54a of the output cylinder 54 is set to a ratio that in a case where the input shaft 48 is rotated, the output cylinder 54 and each of the four planetary rollers 86 do not move relative to each other in the axial direction and the input shaft 48 and each of the four planetary rollers 86 move relative to each other in the axial direction. Therefore, when the input shaft 48 is rotated by the electric motor 44, the four planetary rollers 86 move together with the output cylinder 54.

The basic structure of the motion conversion mechanism 50 described so far, and the operating principle, the operation, and the like of the motion conversion mechanism 50 by the basic structure are already known and are described in detail in, for example, United State Patent Application Publication No. 2008/0196529 A1 (Japanese Unexamined Patent Application Publication No. 2007-56952 (JP 2007-56952 A)), which is incorporated herein by reference. Therefore, the description on the operating principle, the operation, and the like is omitted here.

Figure 4:
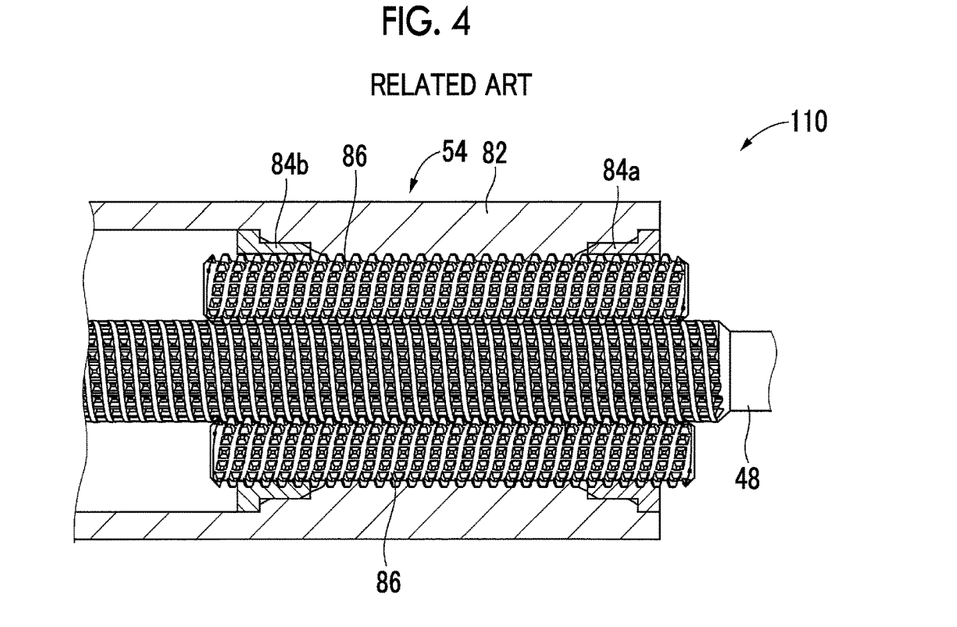
FIG. 4 is a sectional view showing a motion conversion mechanism that has been studied in the related art.

Here, a motion conversion mechanism having the basic structure that has been studied in the related art (hereinafter, there is a case where it is referred to as a "mechanism of the related art") will be described with reference to FIG. 4. As can also be seen from FIG. 4, in a mechanism 110 of the related art, the gear teeth of the four planetary rollers 86 mesh with both of the gear teeth in the first gear region R1 of the output cylinder 54 and the gear teeth in the second gear region R2. Therefore, in the mechanism 110 of the related art, when the rotational positions of the gear teeth of the first gear region R1 and the gear teeth of the second gear region R2 in the circumferential direction, in other words, the phases of the gear teeth of the first gear region R1 and the gear teeth of the second gear region R2 are not accurately matched, a force tilting the planetary rollers 86 in the circumferential direction acts on the planetary rollers 86. A force trying to twist the planetary rollers 86 acts on the planetary rollers 86. When such a force is generated, the operation resistance of the motion conversion mechanism becomes relatively large, and thus a smooth operation is hindered. That is, a torque loss of the motion conversion mechanism occurs, and thus the conversion efficiency of the motion conversion mechanism is deteriorated.

In view of the above, the motion conversion mechanism 50 of the example is configured such that the gear teeth 86c of each of the four planetary rollers 86 mesh with merely the gear teeth on one side of the gear teeth of the first gear region R1 of the output cylinder 54 and the gear teeth of the second gear region R2. Specifically, the four planetary rollers 86 are divided into groups having the same number of planetary rollers, that is, a group composed of two first planetary rollers 86a and a group composed of two second planetary rollers 86b. The first planetary rollers 86a are made so as to mesh with merely the gear teeth of the first gear region R1, that is, the gear teeth formed in the first ring gear 84a, and the second planetary rollers 86b are made so as to mesh with merely the gear teeth of the second gear region R2, that is, the gear teeth formed in the second ring gear 84b.

With the configuration as described above, in the motion conversion mechanism 50, even though the phases of the gear teeth of the first gear region R1 and the gear teeth of the second gear region R2 are not in strict match with each other, the force as described above does not act on any of the planetary rollers 86. Therefore, a smooth operation of the motion conversion mechanism 50 is not hindered, and thus the conversion efficiency of the motion conversion mechanism 50 is good. The length of each of the four planetary rollers 86 is made to be relatively shorter than that in the mechanism 110 of the related art, and therefore, the motion conversion mechanism 50 also has an advantage that it is reduced in weight.

Figure 3C:
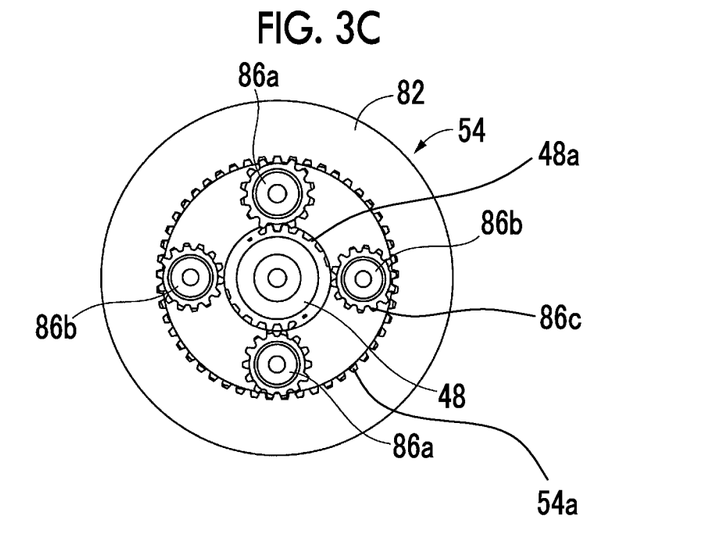
FIG. 3C is a diagram showing the motion conversion mechanism of the example as viewed from an axial direction.

In the motion conversion mechanism 50, the four planetary rollers 86 are disposed at four positions generally equally distributed in the circumferential direction, that is, positions displaced by 90° from each other, as shown in FIG. 3C showing the motion conversion mechanism 50 as viewed from the axial direction. Further, the first planetary rollers 86a and the second planetary rollers 86b are alternately disposed in the circumferential direction. In FIGS. 2 and 3A, for the description of the motion conversion mechanism 50, a state where the first planetary roller 86a and the second planetary roller 86b face each other in the radial direction is illustrated. However, in fact, the two first planetary rollers 86a face each other, and the two second planetary rollers 86b face each other.

Considering the disposition of the planetary rollers 86 as described above, in the motion conversion mechanism 50, the four planetary rollers 86 are disposed such that all the first planetary rollers 86a are located at positions different in the circumferential direction from any of the second planetary rollers 86b. For this reason, it appears that each of the planetary rollers 86 partially supports the output cylinder 54 and the input shaft 48 at a portion where its own external screw is provided. However, as can be seen from FIG. 3A, an overlap region RL that is a region where the first planetary roller 86a and the second planetary roller 86b overlap in the axial direction is present in an intermediate portion in the axial direction. In the overlap region RL, the output cylinder 54 and the input shaft 48 are mutually supported through all the planetary rollers 86, and therefore, the strength of the motion conversion mechanism 50 is relatively high.

Figure 5:
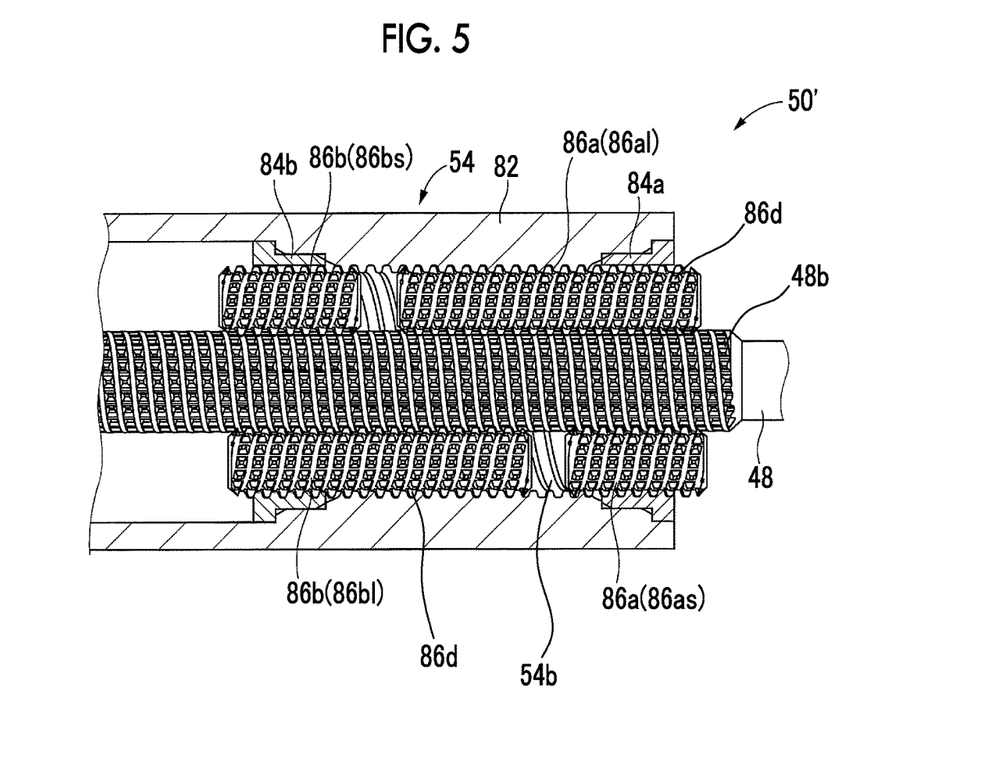
FIG. 5 is a sectional view showing a motion conversion mechanism of a modification example that can be adopted in the electric brake actuator of the example.

In the electric brake actuator 10 of the example, a motion conversion mechanism 50' of a modification example as shown in FIG. 5 can also be adopted. In the motion conversion mechanism 50', the same number of the first planetary rollers 86a and the second planetary rollers 86b, specifically, four first planetary rollers 86a and four second planetary rollers 86b are disposed. Then, one of the four first planetary rollers 86a and one of the four second planetary rollers 86b form a pair, and the one first planetary roller 86a and the one second planetary roller 86b that form a pair are disposed coaxially with each other. That is, each of the four first planetary rollers 86a is disposed coaxially with any one of the four second planetary rollers 86b, and four planetary roller pairs are located at four positions equally distributed in the circumferential direction. In other words, it can also be considered as if each of the planetary rollers 86 in the mechanism 110 of the related art is divided. Even with such disposition of the planetary rollers 86, similar to the motion conversion mechanism 50 of the example, a force tilting each of the planetary rollers 86, in other words, a force trying to twist each of the planetary rollers 86 does not act on each of the planetary rollers 86, and thus the motion conversion mechanism 50' of the modification example operates smoothly and the conversion efficiency is good.

Further, in the motion conversion mechanism 50', as can be seen from the drawing, the four first planetary rollers 86a are composed of two first planetary rollers 86al each having a relatively long length and two first planetary rollers 86as each having a relatively short length. The four second planetary rollers 86b are two second planetary rollers 86bl each having a relatively long length and two second planetary rollers 86bs each having a relatively short length. Then, the relatively long first planetary roller 86al and the relatively short second planetary roller 86bs are coaxially disposed to be paired with each other, and the relatively short first planetary roller 86as and the relatively long second planetary roller 86bl are coaxially disposed to be paired with each other. The two types of planetary roller pairs are alternately arranged in the circumferential direction. Due to such disposition of the planetary rollers 86, in the motion conversion mechanism 50', similar to the motion conversion mechanism 50 of the example, the overlap region RL that is a region where the relatively long first planetary rollers 86al and the relatively long second planetary rollers 86bl overlap in the axial direction is present. Therefore, the motion conversion mechanism 50' has relatively high strength, similar to the motion conversion mechanism 50 of the example. In the drawing, similar to the motion conversion mechanism 50 of the example, for the description of the motion conversion mechanism 50', a state where the relatively long first planetary roller 86al and the relatively short second planetary roller 86bs face the relatively long second planetary roller 86bl and the relatively short first planetary roller 86as in the radial direction is illustrated. However, in fact, the relatively long first planetary roller 86al and the relatively short second planetary roller 86bs face each other, and the relatively long second planetary roller 86bl and the relatively short first planetary roller 86as face each other.

In the motion conversion mechanisms 50, 50' of the example and the modification example, a configuration is made so as to convert the rotational motion of the input shaft 48 that is a shaft body into the linear motion of the output cylinder 54 that is a cylindrical body. However, it is also possible to provide a motion conversion mechanism that converts the rotational motion of the cylindrical body into the linear motion of the shaft body.

Further, in the motion conversion mechanisms 50, 50' of the example and the modification example, a configuration is made such that the planetary rollers 86 and the output cylinder 54 that is a cylindrical body do not move relative to each other in the axial direction and the planetary rollers 86 and the input shaft 48 that is a shaft body move relative to each other in the axial direction. However, at least one of the ratio between the number of threads of the external screw of the shaft body, the number of threads of the external screw of each of the planetary rollers, and the number of threads of the internal screw of the cylindrical body, and the ratio between the number of teeth of the gear teeth of the shaft body, the number of teeth of the gear teeth of each of the planetary rollers, and the number of teeth of the gear teeth of the cylindrical body is changed, and thus a configuration may be made such that the shaft body and the planetary rollers do not move relative to each other in the axial direction and the planetary rollers and the cylindrical body move relative to each other, and a configuration may be made such that the shaft body and the planetary rollers move relative to each other in the axial direction and the planetary rollers and the cylindrical body move relative to each other in the axial direction.

Further, in the motion conversion mechanism 50 of the example, the number of planetary rollers is set to be four, and in the motion conversion mechanism 50' of the modification example, the number of planetary rollers is set to be eight. However, in the motion conversion mechanism, the number of planetary rollers is not particularly limited, and the disposition positions of the planetary rollers in the circumferential direction are also not particularly limited.

What is claimed is:
1. A motion conversion mechanism comprising:
a cylindrical body;
a shaft body disposed coaxially with the cylindrical body, and the shaft body being inside the cylindrical body; and
a plurality of planetary rollers, each of the planetary rollers being disposed between the shaft body and the cylindrical body, being configured to revolve around the shaft body, and being configured to rotate on a planetary roller's own axis, and the plurality of the planetary rollers includes a plurality of first planetary rollers and a plurality of second planetary rollers,
wherein:
the shaft body has a shaft body external screw and shaft body gear teeth in an outer periphery of the shaft body;
the plurality of the first planetary rollers has a first planetary roller external screw which meshes with the shaft body external screw of the shaft body, and a first planetary roller gear teeth which meshes with the shaft body gear teeth of the shaft body, in an outer periphery of the plurality of the first planetary rollers;
the plurality of the second planetary rollers has a second planetary roller external screw which meshes with the shaft body external screw of the shaft body, and a second planetary roller gear teeth which meshes with the shaft body gear teeth of the shaft body, in an outer periphery of the plurality of the second planetary rollers;
the cylindrical body has an internal screw provided in a screw region that is an intermediate region in an axial direction of the cylindrical body, and meshes with the first planetary roller external screw and the second planetary roller external screw, and a first cylindrical body gear teeth and a second cylindrical body gear teeth, each of which is provided in each of a first gear region and a second gear region, which are two regions sandwiching the screw region between the two regions in the axial direction;
the first planetary roller external screw provided in each of the first planetary rollers meshes with the internal screw provided in the screw region of the cylindrical body, and the first planetary roller gear teeth provided in each of the first planetary rollers mesh with the first cylindrical body gear teeth provided in the first gear region of the cylindrical body without meshing with the second gear teeth provided in the second cylindrical body gear region of the cylindrical body; and
the second planetary roller external screw provided in each of the second planetary rollers meshes with the internal screw provided in the screw region of the cylindrical body, and the second planetary roller gear teeth provided in each of the second planetary rollers mesh with the second cylindrical body gear teeth provided in the second gear region of the cylindrical body without meshing with the first cylindrical body gear teeth provided in the first gear region of the cylindrical body.

2. The motion conversion mechanism according to claim 1, wherein:
the shaft body external screw and the shaft body gear teeth of the shaft body are provided in the same region in the axial direction;
the first planetary roller external screw and the first planetary rollers gear teeth of the first planetary rollers are provided in the same region in the axial direction; and
the second planetary roller external screw and the second planetary rollers gear teeth of the second planetary rollers are provide in the same region in the axial direction.

3. The motion conversion mechanism according to claim 1, wherein:
the number of the first planetary rollers is equal to the number of the second planetary rollers; and
each of the first planetary rollers is disposed coaxially with any one of the second planetary rollers.

4. The motion conversion mechanism according to claim 1, wherein the first planetary rollers and the second planetary rollers are disposed such that all the first planetary rollers are located at positions different in a circumferential direction from any of the second planetary rollers.

5. The motion conversion mechanism according to claim 4, wherein the first planetary rollers and the second planetary rollers are disposed such that each of the first planetary rollers overlaps with any of the second planetary rollers in the axial direction.

6. The motion conversion mechanism according to claim 1, wherein:
the cylindrical body is configured to include a main body, and a first ring and a second ring respectively fixed to both ends of the main body in the axial direction of the main body;
the main body has the internal screw; and
the first ring provided in the first gear region has the first cylindrical body gear teeth, and the second ring provided in the second gear region has the second cylindrical body gear teeth.

7. The motion conversion mechanism according to claim 1, wherein each of a first ratio between the number of threads of the shaft body external screw provided in the shaft body, the number of threads of the first planetary roller external screw provided in the first planetary rollers, the number of threads of the second planetary roller external screw provided in the second planetary rollers, and the number of threads of the internal screw provided in the cylindrical body, and a second ratio between the number of teeth of the shaft body gear teeth provided in the shaft body, the number of teeth of the first planetary rollers gear teeth provided in the first planetary rollers, the number of teeth of the second planetary rollers gear teeth provided in the second planetary rollers, and the number of teeth of the first cylindrical body gear and the second cylindrical body gear teeth provided in the cylindrical body is set to a ratio that in a case where one of the cylindrical body and the shaft body is rotated, the cylindrical body and each of the first and second planetary rollers do not move relative to each other in the axial direction and the shaft body and each of the first and second planetary rollers move relative to each other in the axial direction.

8. An electric brake actuator comprising:
an electric motor;
a piston configured to press a friction member against a rotating body that rotates together with a wheel; and
the motion conversion mechanism according to claim 1, wherein the motion conversion mechanism is configured such that one of the cylindrical body and the shaft body is rotated by the electric motor and the other of the cylindrical body and the shaft body linearly moves the piston in the axial direction.

* * * * *